(12) United States Patent
Mi et al.

(10) Patent No.: US 7,295,262 B2
(45) Date of Patent: Nov. 13, 2007

(54) DISPLAY APPARATUS HAVING COLLIMATED ILLUMINATION

(75) Inventors: Xiang-Dong Mi, Rochester, NY (US); Tomohiro Ishikawa, Rochester, NY (US); David Kessler, Rochester, NY (US)

(73) Assignee: Rohm and Haas Denmark Finance A/S, Copenhagen (DK)

( * ) Notice: Subject to any disclaimer, the term of this patent is extended or adjusted under 35 U.S.C. 154(b) by 258 days.

(21) Appl. No.: 11/102,131

(22) Filed: Apr. 8, 2005

(65) Prior Publication Data

US 2006/0227259 A1    Oct. 12, 2006

(51) Int. Cl.
*G02F 1/1335* (2006.01)
*A47F 3/00* (2006.01)
(52) U.S. Cl. ............................ 349/65; 362/561; 349/64
(58) Field of Classification Search ................... 349/64, 349/65, 61; 362/561
See application file for complete search history.

(56) References Cited

U.S. PATENT DOCUMENTS

| | | | |
|---|---|---|---|
| 5,592,332 A | 1/1997 | Nishio et al. | |
| 5,629,784 A | 5/1997 | Abileah et al. | |
| 6,111,696 A | 8/2000 | Allen et al. | |
| 6,280,063 B1 | 8/2001 | Fong et al. | |
| 6,327,091 B1 | 12/2001 | Agano | |
| 6,421,103 B2 | 7/2002 | Yamaguchi | |
| 6,746,130 B2 | 6/2004 | Ohkawa | |
| 6,791,639 B2* | 9/2004 | Colgan et al. | 349/95 |
| 2004/0105046 A1* | 6/2004 | Taira et al. | 349/61 |
| 2004/0170011 A1* | 9/2004 | Kim et al. | 362/31 |

FOREIGN PATENT DOCUMENTS

| | | |
|---|---|---|
| JP | 59007928 | 1/1984 |
| JP | 06082781 | 3/1994 |

OTHER PUBLICATIONS

Dir G A: "Twisted Nematic Display With Improved Multiplexability Utilizing Simple Alignment Technique" Xerox Disclosure Journal, Xerox Corporation. Stamford, Conn., US, vol. 5, No. 5, Sep. 1980. pp. 561-562, XP002034530.

* cited by examiner

*Primary Examiner*—Toan Ton
(74) *Attorney, Agent, or Firm*—Edwin Oh

(57) ABSTRACT

A display apparatus (30) has an LC device (14) exhibiting its maximum contrast with incident light at an oblique angle $\phi$ from normal, wherein oblique angle $\phi$ is greater than about +/-10 degrees from normal. A backlight unit (32) provides substantially collimated illumination with a central ray at an incident angle $\theta_2$ with respect to the LC device (14), wherein incident angle $\theta_2$ within about +/-5 degrees of oblique angle $\phi$. The full-width half-maximum intensity of the illumination is within about +/-10 degrees of the central ray at incident angle $\theta_2$.

5 Claims, 6 Drawing Sheets

DISPLAY APPARATUS HAVING COLLIMATED ILLUMINATION

FIELD OF THE INVENTION

This invention generally relates to liquid crystal display (LCD) apparatus and more particularly relates to a liquid crystal display apparatus using collimated backlight that is angularly inclined with respect to normal.

BACKGROUND OF THE INVENTION

Liquid crystal displays continue to improve in cost and performance, becoming a preferred display type for many computer, instrumentation, and entertainment applications. While LCDs are advantaged for minimal thickness, low weight, and reasonably good color characteristics, there are some significant drawbacks with this display technology. Among the major drawbacks of LCDs are relatively low brightness and disappointing contrast.

The transmissive LCD used in conventional laptop computer displays is a type of backlit display, having a light providing surface positioned behind the LCD for directing light outwards, towards the LCD. The challenge of providing a suitable backlight apparatus that is both compact and low cost has been addressed following one of two basic approaches. In the first approach, a light-providing surface is used to provide a highly scattered, essentially Lambertian light distribution, having an essentially constant luminance over a broad range of angles. Following this first approach, with the goal of increasing on-axis and near-axis luminance, a number of brightness enhancement films have been proposed for redirecting a portion of this light having Lambertian distribution in order to provide a more collimated illumination. Among proposed solutions for brightness enhancement films are those described in U.S. Pat. No. 5,592,332 (Nishio et al.); U.S. Pat. No. 6,111,696 (Allen et al); U.S. Pat. No. 6,280,063 (Fong et al.); and U.S. Pat. No. 5,629,784 (Abileah et al.), for example. Solutions such as the brightness enhancement film (BEF) described in the patents cited above provide some measure of increased brightness over wide viewing angles. However, overall contrast, even with a BEF, remains relatively poor.

A second approach to providing backlight illumination employs a light guiding plate (LGP) that accepts incident light from a lamp or other light source disposed at the side and guides this light internally using Total Internal Reflection (TIR) so that emitted light has a restricted range of angles. The output light from the LGP is typically at a fairly steep angle with respect to normal, such as 80 degrees or more. With this second approach, a turning film is then used to redirect the emitted light output from the LGP toward normal. Directional turning films, broadly termed light redirecting films, such as that provided with the HSOT (Highly Scattering Optical Transmission) light guide panel available from Clarex, Inc., Baldwin, N.Y., provide an improved solution for providing a uniform backlight of this type, without the need for diffusion films or for dot printing in manufacture. HSOT light guide panels and other types of directional turning films use arrays of prism structures, in various combinations, to redirect light from a light guiding plate toward normal, relative to the two-dimensional surface. As one example, U.S. Pat. No. 6,746,130 (Ohkawa) describes a light control sheet that acts as a turning film for LGP illumination.

Improving upon this second approach, U.S. Pat. No. 6,421,103 entitled "Liquid-Crystal Display Apparatus Including a Backlight Section Using Collimating Plate" to Yamaguchi and U.S. Pat. No. 6,327,091 entitled "Collimating Plate and Backlight System" to Agano both disclose providing collimated illumination from the backlight to the LCD. It has been shown that collimated light generally improves the contrast ratio of the LCD and, when used in conjunction with a diffuser for the modulated light, may effectively increase the usable viewing angle. Referring to FIG. 1A, an LC display 10 has a backlight unit 12 that provides collimated illumination, at a normal angle, to an LC device 14. LC device 14 has a liquid crystal material sandwiched between transparent substrates. A diffuser 16 then diffuses the modulated light from LC device 14, expanding the viewing angle as indicated in FIG. 1A. Referring to FIG. 1B, there is shown a cone of illumination 20 about a central ray 22 provided from backlight unit 12. Central ray 22, sometimes alternately termed a chief or principal ray, is normal with respect to the surface of LC device 14. The above approaches provide some amount of increased contrast when using LGP illumination. However, there is still room for improvement. Moreover, it is not clear whether or not further contrast gains achieved using this approach might be offset by loss of viewing angle.

An alternate strategy for optimizing contrast is directed toward optimizing performance of the LC device itself. Referring to FIGS. 2A, 2B, and 2C, there are shown conventional contrast plots obtained for a Twisted Nematic (TN) LC device using the EZCONTRAST Conoscope for measuring luminance, contrast, and color, from Eldim Corporation, Saint Clair, France. FIG. 2A is obtained for a TN LC device at a low voltage (3.6V nominal). FIG. 2B shows contrast for a higher voltage level (4.0V nominal). FIG. 2C shows contrast for an even higher voltage level (5.0V nominal). A maximum contrast area 24 denotes the highest contrast characteristic, which moves toward normal as voltage increases. (In the graphical representation of FIGS. 2A-2C, measurements for the horizontal and vertical axes are as labeled in FIG. 2A.) As the progression of FIGS. 2A, 2B, and 2C indicates, there is measurable contrast improvement for TN LCDs with increased drive voltage. The fact that the maximum contrast does not necessarily occur at the normal direction also holds for other LC types, including Vertically Aligned (VA) LCDs and Optically Compensated Birefringence type (OCB) LCDs, among others.

Since the progression of FIGS. 2A-2C shows improved contrast at higher voltages, the approach for increasing the contrast ratio that suggests itself is simply to employ higher drive voltages. While this is straightforward, such an approach has undesirable ramifications. In order to handle the additional power requirement for improved contrast at normal angles, it is necessary to fabricate the Thin-Film Transistor (TFT) devices that drive each LCD pixel using thicker electrode materials and larger components. This adds cost to LC device fabrication and imposes size constraints that limit display resolution. Thus, increased drive voltage has proved to be of limited value for providing higher device contrast.

While methods described above have provided some incremental improvements in display contrast, further contrast ratio enhancement is necessary in order to use LCDs more effectively for images having subtle detail, such as those used for medical diagnosis. Thus, there is a need for apparatus and methods that enhance the contrast of LC display devices without increasing device cost, complexity, or size.

SUMMARY OF THE INVENTION

It is an object of the present invention to provide a display apparatus comprising:

(a) an LC device exhibiting its maximum contrast with incident light at an oblique angle φ from normal, wherein oblique angle φ is greater than about +/−10 degrees from normal; and, (b) a backlight unit providing substantially collimated illumination with a central ray at an incident angle $\theta_2$ with respect to the LC device, wherein incident angle $\theta_2$ is within about +/−5 degrees of oblique angle φ and wherein the full-width half-maximum intensity of the illumination is within about +/−10 degrees of the central ray at incident angle $\theta_2$.

The present invention provides collimated illumination at an angle that is well suited to the contrast characteristics of liquid crystal devices. The present invention further provides improved contrast without the requirement for additional components and consequent loss of brightness.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

The present invention improves LC device contrast by providing a collimated backlight, wherein the central ray of the collimated light (also termed the chief or principal ray) is at an oblique angle with respect to normal and is closely matched to the angular contrast characteristics of the LC device. That is, instead of providing light in a normal direction from the backlighting unit (perpendicular to the LC device surface), the present invention provides this light at a more favorable angle for contrast.

Figure 1A:
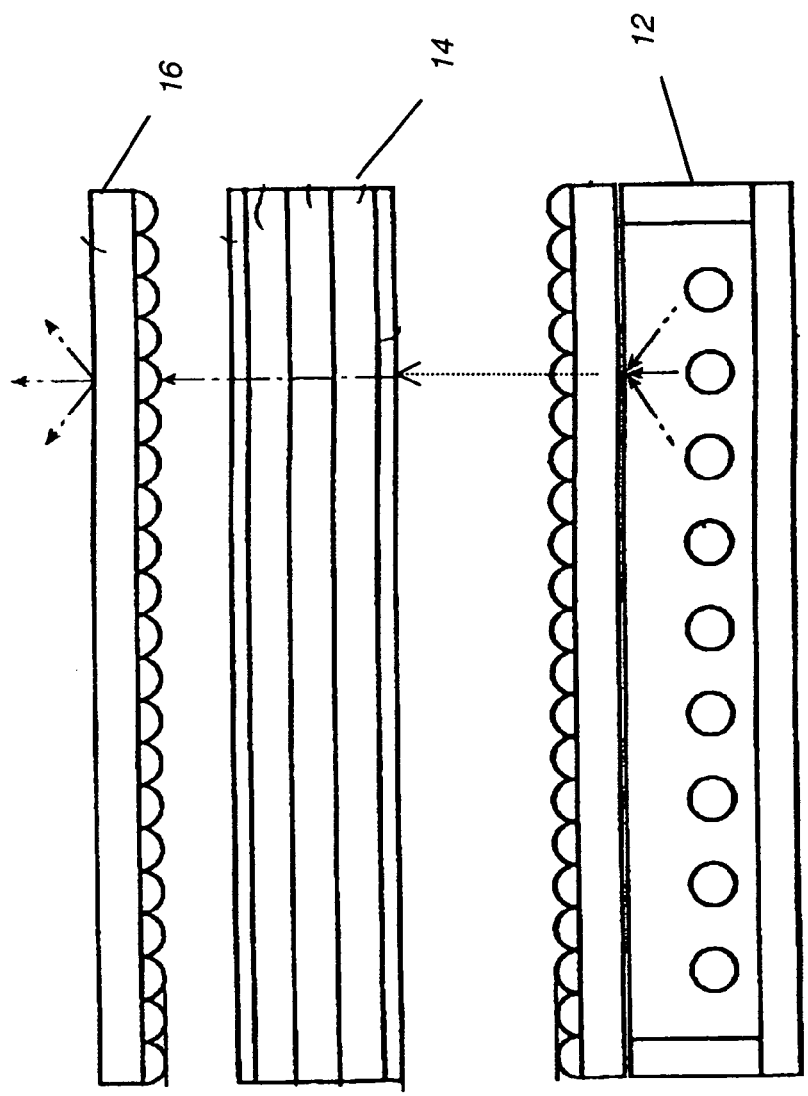
FIG. 1A is a schematic view of an LC display using a collimated backlight.
Figure 1B:
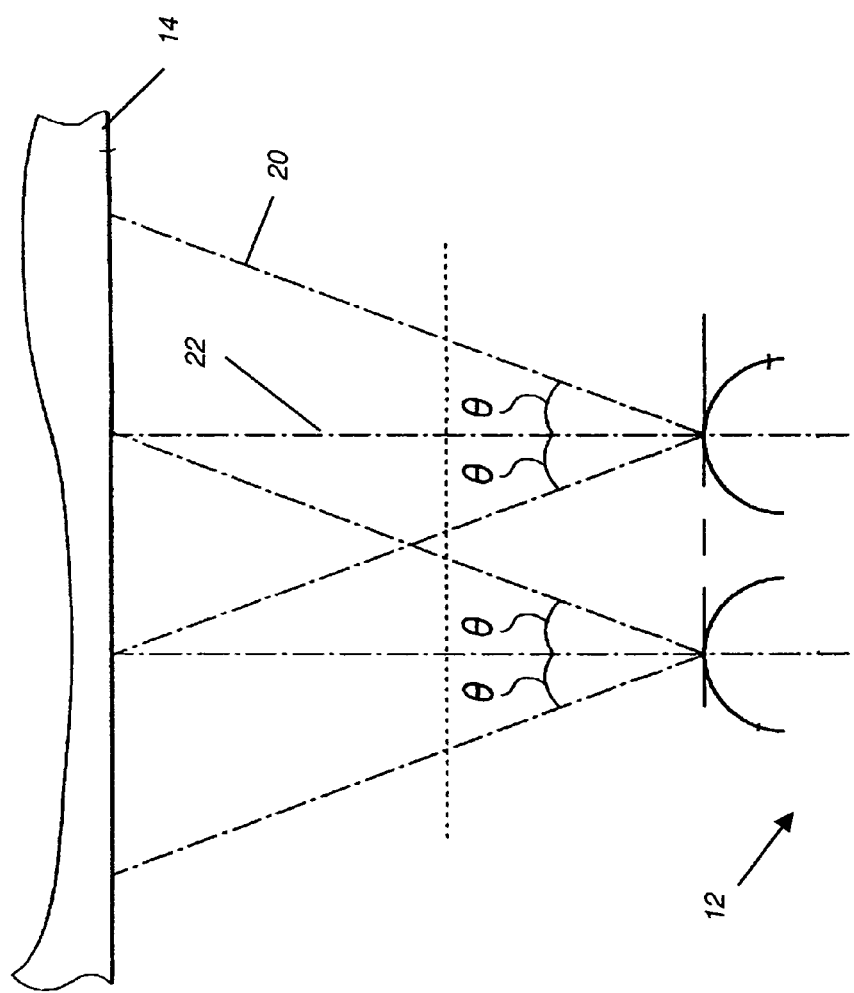
FIG. 1B is an enlarged side view showing the direction and angular spread of collimated light from a conventional collimated backlight.
Figure 2C:
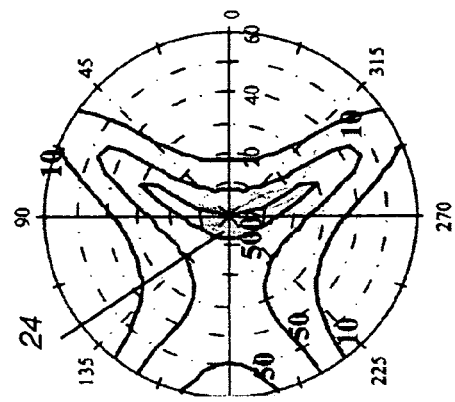
FIGS. 2A, 2B, and 2C are contrast plots for LC devices at various drive voltage levels.
Figure 2B:
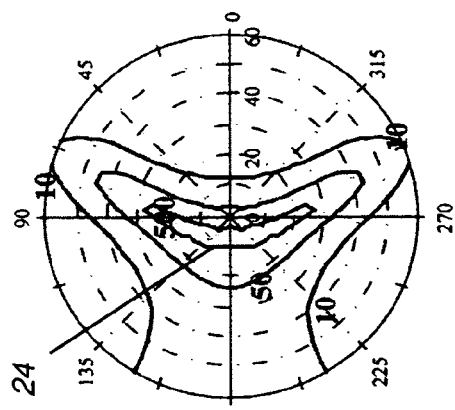
Figure 2A:
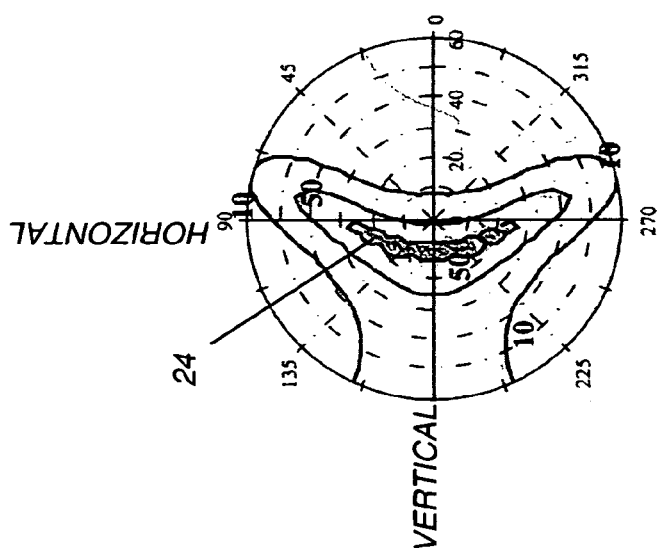
Figure 3:
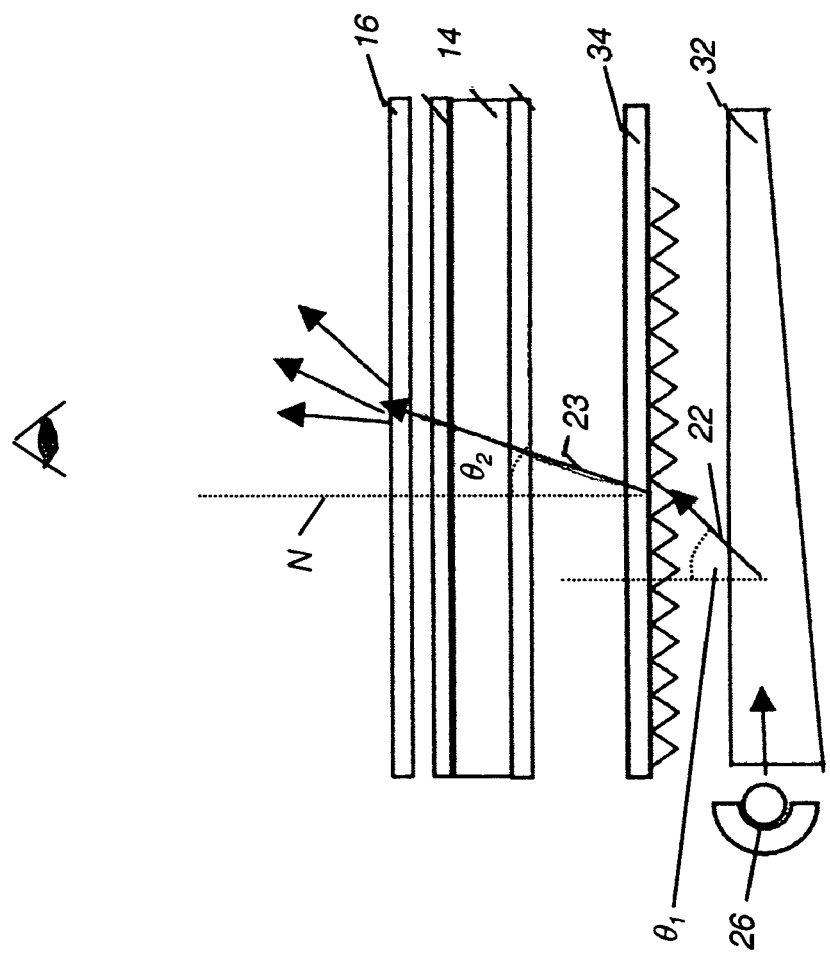
FIG. 3 is a schematic view showing a backlight unit providing collimated light at an oblique angle according to the present invention, using a light redirecting film.

Referring back to the contrast plots of FIGS. 2A, 2B, and 2C, it was pointed out that best contrast, shown as maximum contrast area 24, is often achieved for light that is at an angle that is measurably oblique from normal. For LC devices 14 under a range of voltage bias conditions, the incident light angle for which maximum contrast is provided can typically be greater than about 10 degrees from normal. Referring now to FIG. 3, there is shown a display 30 having a tapered light guiding plate 32, such as a CLAREX® Highly Scattering Optical Transmission (HSOT) backlight. A light source 26, such as a Cold Cathode Fluorescent Light (CCFL), provides source illumination incident to light guiding plate 32. The light emitted from light guiding plate 32 is substantially collimated, so that the Full-Width Half Maximum (FWHM) luminance for this light is approximately within about +/−10 degrees about central ray 22 for this light. As is shown in FIG. 3 central ray 22 from light guiding plate 32 is at an oblique angle $\theta_1$. This light then goes to a light redirecting film 34, which in this embodiment is also known as a turning film. Light redirecting film 34 redirects central ray 22 to provide a central ray 23 of redirected light that is incident to LC device 14 at an oblique incident angle $\theta_2$. For the purpose of this description, the output angle of light from light redirecting film 34 is termed incident angle $\theta_2$ since this light is incident to LC device 14. The light passing through light redirecting film 34 is also substantially collimated, so that the Full-Width Half Maximum (FWHM) luminance for this light at incident angle $\theta_2$ is approximately within about +/−10 degrees about its central ray 23. This collimated, redirected light, at oblique incident angle $\theta_2$ with respect to normal axis N, is then modulated by LC device 14. The modulated light then goes to diffuser 16 to spread the viewing angle over a broader range.

Light redirecting film 34 of the present invention is preferably fabricated from a flexible, transparent material, most preferably from a polymeric material. There are a number of suitable polymers that are inexpensive and have high light transmission properties. Suitable materials include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers can be used.

Figure 4:
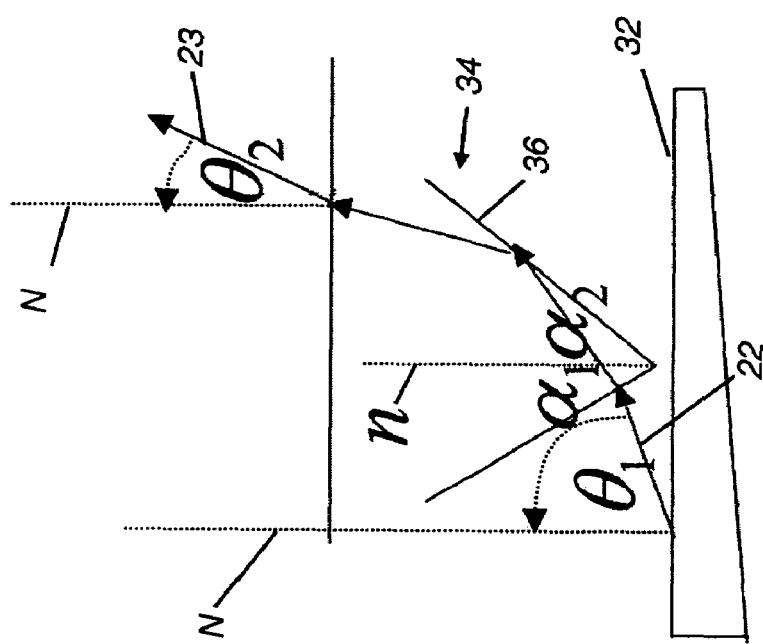
FIG. 4 is a schematic view showing the path of central rays through a light redirecting film prism structure according to the present invention.

FIG. 4 shows the light path at a single prism element 36 of light redirecting film 34. Peak half-angles α1 and α2 may or may not be equal. Incident angle $\theta_2$ provided to LC device 14 can be determined using the following:

$$\theta_2 = \sin^{-1}\left\{ n \sin\left[ 2\alpha_2 + \alpha_1 - 90^0 - \sin^{-1}\left(\frac{1}{n}\sin(\theta_1 + \alpha_2 - 90^0)\right) \right] \right\}$$

Where:
Typical refractive index n is in a range of 1.45 to 1.8
Typical input angle $\theta_1$ is in a range of 60 to 80°.
Typical half angles $\alpha_1$ and $\alpha_2$ are in a range of 20 to 40°.

The following table summarizes a few examples that provide incident angle $\theta_2$ approximately to be 10° offset from the normal direction.

| $\theta_1$ | n | $\alpha_1$ | $\alpha_2$ | $\theta_2$ |
|---|---|---|---|---|
| 64° | 1.49 | 34° | 34° | 9.92° |
| 70° | 1.49 | 46° | 34° | 10.3° |
| 70° | 1.49 | 34° | 36° | 9.94° |
| 70° | 1.49 | 34° | 29° | −11.0° |
| 70° | 1.6 | 34° | 29° | −10.75° |
| 70° | 1.49(any) | 30° | 30° | −10.0° |
| 50° | 1.49(any) | 30° | 30° | 10.0° |

ALTERNATE EMBODIMENTS

Figure 5:
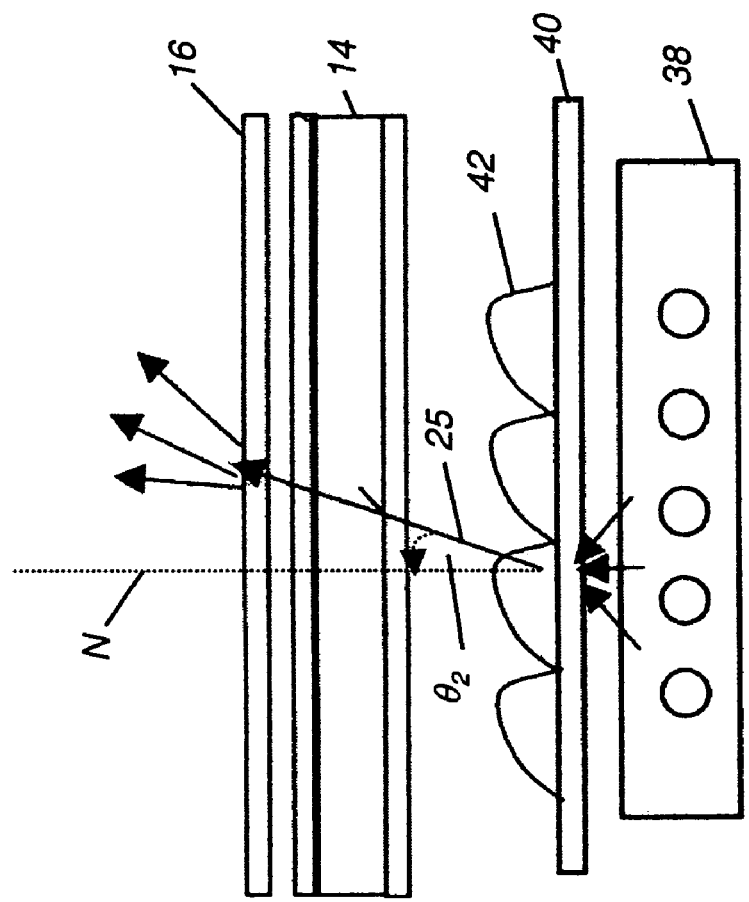
FIG. 5 is a schematic view showing a scattering backlight unit providing collimated light at an oblique angle according to another embodiment of the present invention.

The approach used in the present invention is particularly advantageous for backlight display apparatus using light guiding plate 32 and light redirecting film 34 to provide illumination. However, this same overall approach can be applied when using other types of surface-area light plates and their supporting light conditioning films. For example, FIG. 5 shows a backlight unit 12 of the scattering type (such as those often used with brightness enhancement films, as described in the background section above). Light output from a light providing surface 38, substantially Lambertian in distribution, is then collimated by a collimating film 40 or other type of collimating element. Collimating structures 42 on collimating film 40 are asymmetric, as shown in FIG. 5, providing collimated light having a central ray 25 that is at an incident angle $\theta_2$ to LC device 14 with respect to normal N.

In order to achieve the contrast ratios necessary for applications requiring particularly good contrast, such as for medical images, the present invention matches, as closely as possible, the maximum contrast angle of LC device 14 with the angle of the central ray of incident illumination from backlight unit 12 and its supporting light conditioning films, such as a turning film, for example.

As was shown with reference to FIGS. 2A-2C, a particular type of LC device, such as a TN, In-Plane Switching (IPS), VA, or OCB device, can have its best contrast response to light that is incident at an oblique angle φ that is appreciably off-axis from normal. The oblique angle φ can be between about +/−25 and +/−10 degrees from normal.

The method of the present invention is particularly suitable where oblique angle φ is greater than about +/−10 degrees from normal. The method of the present invention increases in value as the dimension of oblique angle φ increases. In any particular case, as noted in the background section above, oblique angle φ is a factor of the voltage applied. The technique of the present invention provides substantially collimated light having a central ray an incident angle $\theta_2$ that is within about +/−5 degrees of oblique angle φ and wherein the FWHM intensity of the illumination is within about +/−10 degrees of the central ray. The orientation of LC device 14 itself can be optimized for the application, such as by rotating components for best angle.

Depending on the LC device type and its uses, other types of components could also be disposed in the light path. These include polarizers, filters, compensation films, and other light-conditioning components, for example.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, while the described embodiments use either the combination of LGP 32 with light redirecting film 34 or the combination of scattering light providing surface 38 with collimating film 40, other types of light-conditioning components could alternately be used as backlight unit 12 to provide light at favorable angles for contrast.

Thus, what is provided is an apparatus and method for providing a liquid crystal display apparatus using collimated backlight that is angularly inclined with respect to normal.

PARTS LIST

10. Display
12. Backlight unit
14. LC device
16. Diffuser
20. Cone of illumination
22. Central ray
23. Central ray
24. Maximum contrast area
25. Central ray
26. Light source
30. Display
32. Light guiding plate (LGP)
34. Light redirecting film
36. Prism element
38. Light providing surface
40. Collimating film
42. Collimating structure
N. Normal
$\theta_1$. Angle
$\theta_2$. Incident angle
α1, α2. Angle
φ. Oblique angle

The invention claimed is:

1. A method for forming an image comprising:
   (a) providing an LC device exhibiting its maximum contrast with incident light at an oblique angle φ from normal, wherein oblique angle φ is greater than about +/−10 degrees from normal; and,
   (b) directing a substantially collimated illumination as incident light to the LC device, with a central ray at an incident angle $\theta_2$ with respect to the LC device within about +/−5 degrees of oblique angle φ and wherein the full-width half-maximum intensity of the illumination is within about +/−10 degrees of the central ray at incident angle $\theta_2$.

2. The method of claim 1 wherein the step of providing an LC device comprises the step of providing a twisted nematic LC device.

3. The method of claim 1 wherein oblique angle φ is between about +/−10 degrees from normal and +/−25 degrees from normal.

4. The method of claim 1 wherein directing a substantially collimated illumination comprises the step of disposing a light redirecting film between a light guiding plate and the LC device.

5. The method of claim 1 wherein directing a substantially collimated illumination comprises the step of disposing a collimating film between a light providing surface and the LC device.

* * * * *